(12) United States Patent
Iafrate

(10) Patent No.: US 12,503,973 B2
(45) Date of Patent: Dec. 23, 2025

(54) DEGASSING TANK

(71) Applicant: Illinois Tool Works Inc., Glenview, IL (US)

(72) Inventor: Serge Iafrate, Montmerle sur Saône (FR)

(73) Assignee: Illinois Tool Works Inc., Glenview, IL (US)

( * ) Notice: Subject to any disclaimer, the term of this patent is extended or adjusted under 35 U.S.C. 154(b) by 358 days.

(21) Appl. No.: 18/349,586

(22) Filed: Jul. 10, 2023

(65) Prior Publication Data

US 2024/0024799 A1    Jan. 25, 2024

(30) Foreign Application Priority Data

Jul. 21, 2022 (FR) ........................................ 2207508
Jun. 27, 2023 (EP) ..................................... 23181599

(51) Int. Cl.
| | |
|---|---|
| *F01P 11/02* | (2006.01) |
| *B01D 19/00* | (2006.01) |
| *B60K 11/02* | (2006.01) |
| *F16K 11/076* | (2006.01) |

(52) U.S. Cl.
CPC ........ *F01P 11/028* (2013.01); *B01D 19/0042* (2013.01); *B01D 19/0063* (2013.01); *F16K 11/076* (2013.01); *B60K 11/02* (2013.01); *F01P 11/029* (2013.01); *F05B 2210/403* (2013.01); *Y10T 137/86662* (2015.04)

(58) Field of Classification Search
None
See application file for complete search history.

(56) References Cited

FOREIGN PATENT DOCUMENTS

FR     3016923 A3 *  7/2015 ............ F01P 11/029

OTHER PUBLICATIONS

FR3016923A3_ENG (Espacenet machine translation of Volny-Anne) (Year: 2015).*

* cited by examiner

*Primary Examiner* — Gabriel E Gitman
(74) *Attorney, Agent, or Firm* — McAndrews, Held & Malloy, Ltd.

(57) ABSTRACT

The disclosure relates to a degassing tank (1) comprising a first inlet (20) and a dip tube (4) extending between the first inlet (20) and a lower part (3) of the tank (1), in which the dip tube (4) is movable, when in use, relative to the first inlet (20) between a first position in which the dip tube (4) provides a fluid line between the first inlet (20) and the lower part (3) of the tank (1), and a second position in which the fluid communication between the first inlet (20) and the lower part (3) of the tank (1) is closed.

15 Claims, 6 Drawing Sheets

DEGASSING TANK

RELATED APPLICATIONS

The present application claims the benefit of French Patent Application Serial No. 2207508, filed Jul. 21, 2022, and to European Patent Application Serial No. 23181599.4, filed Jun. 27, 2023. The entireties of French Patent Application Serial No. 2207508 and European Patent Application Serial No. 23181599.4 are expressly incorporated herein by reference.

TECHNICAL FIELD

The disclosure generally relates to a degassing tank. More specifically, but not exclusively, the present disclosure relates to a degassing tank for a motor vehicle cooling system.

BACKGROUND

A degassing tank is commonly provided to eliminate gases, mainly air, that may penetrate into the heat transfer fluid, typically a coolant.

FR3016923A describes such a degassing tank, which comprises an inlet at the top of the tank, an outlet at the bottom of the tank, a dip tube fluidly connecting the inlet to a lower part of the tank and a baffle between the dip tube and the outlet.

SUMMARY

The disclosure aims to provide a degassing tank with a simple means of controlling the flow of a liquid introduced from the inlet into the tank.

The disclosure relates to a degassing tank comprising a first inlet and a dip tube extending between the first inlet and a lower part of the tank, in which the dip tube is movable, when in use, relative to the first inlet between a first position in which the dip tube provides a fluid line between the first inlet and the lower part of the tank, and a second position in which the fluid communication between the first inlet and the lower part of the tank is closed.

The dip tube can comprise a fluid passage. The fluid passage can be aligned with the first inlet when the dip tube is in the first position, for example to thereby connect the first inlet to the inside of the dip tube. The dip tube can comprise a peripheral surface that can close off the inlet when the dip tube is in the second position.

More specifically, the dip tube can comprise a fluid passage that is aligned with the first inlet when the dip tube is in the first position, thereby connecting the first inlet to the inside of the dip tube, and a peripheral surface that closes off the first inlet when the dip tube is in the second position.

The dip tube can be rotatable relative to the first inlet. The fluid passage in the dip tube can comprise a recess. The recess can be partially circumferential. The fluid passage in the dip tube can comprise a hole. The hole can be radial. The hole can be in the recess.

More specifically, the dip tube can be rotatable relative to the first inlet, in which the fluid passage in the dip tube comprises a partially circumferential recess with a radial hole in it.

The tank can comprise a valve housing. The valve housing can be tubular. The valve housing can comprise the first inlet. The dip tube can be accommodated, for example rotatably, inside the valve housing. The dip tube can be accommodated, for example rotatably, inside a tubular valve housing.

According to one embodiment of the present disclosure, the tank comprises a tubular valve housing that comprises the first inlet.

More specifically, the dip tube can be rotatably accommodated inside a tubular valve housing.

The tank can comprise a second inlet. The dip tube can provide a fluid line between the second inlet and the lower part of the tank, for example when the dip tube is in the second position. The dip tube can provide a fluid line between the second inlet and the lower part of the tank when the dip tube is in the first position. The dip tube can provide a fluid line between the second inlet and the lower part of the tank when the dip tube is in each of the first and second positions.

More specifically, the tank can comprise a second inlet, in which the dip tube provides a fluid line between the second inlet and the lower part of the tank when the dip tube is in each of the first and second positions.

In other examples, the fluid communication between the second inlet and the lower part of the tank can be closed when the dip tube is in the first position. In addition or alternatively, the dip tube can provide a fluid line between the second inlet and the lower part of the tank when the dip tube is in the second position.

In still other examples, the dip tube can take first, second, and third positions. The dip tube can provide a fluid line between each of the first and second inlets and the lower part of the tank when the dip tube is in the first position. The fluid communication between the first inlet and the lower part of the tank can be closed when the dip tube is in the second position. The dip tube can provide a fluid line between the second inlet and the lower part of the tank when the dip tube is in the second position. The fluid communication between each of the first and second inlets and the lower part of the tank can be closed when the dip tube is in the third position.

The tank can comprise an actuating means or an actuator, for example, to move the dip tube between the first and second positions.

The tank can comprise an outlet. The outlet can be in the lower part of the tank. The tank can comprise a baffle. The baffle can be between the dip tube and the outlet. The baffle can at least partially surround the outlet.

The tank can comprise a neck describing an opening for introducing a liquid into the tank. The tank can comprise a cap to releasably close the neck. The cap can be threadedly engaged with the neck, or can be configured to be threadedly engaged with the neck.

The disclosure also relates to a cooling circuit comprising a degassing tank as described above.

The disclosure also relates to a vehicle comprising a cooling circuit and/or a degassing tank as described above.

For the avoidance of doubt, all the features described herein also apply to any aspect of the disclosure.

As part of this application, it is expressly provided that the various aspects, embodiments, examples and alternatives disclosed in the preceding paragraphs, in the claims and/or in the following description and drawings, and in particular the individual features thereof, may be taken separately or in any combination. In other words, all embodiments and/or features of any embodiment may be combined in any way, unless these features are incompatible.

For the avoidance of doubt, the terms "can", "and/or", "for example", "for example" [sic: repeated expression] and any other similar term used herein must be interpreted as not limiting, such that any feature described herein is not necessarily required to be present. Indeed, any combination of optional features is expressly foreseen without departing from the scope of the disclosure, whether or not they are expressly claimed. The applicant reserves the right to amend any claim originally filed or to file any new claim accordingly, including the right to amend any claim originally filed to depend on and/or incorporate any feature of any other claim, though it is not originally claimed in this manner.

BRIEF DESCRIPTION OF THE DRAWINGS

Other features and advantages of the disclosure will become apparent from the following detailed description, which will be understood in reference to the appended drawings, in which.

DETAILED DESCRIPTION

Different aspects of different embodiments of the disclosure are described in more detail below, in reference to FIGS. 1 to 6.

Figure 1:
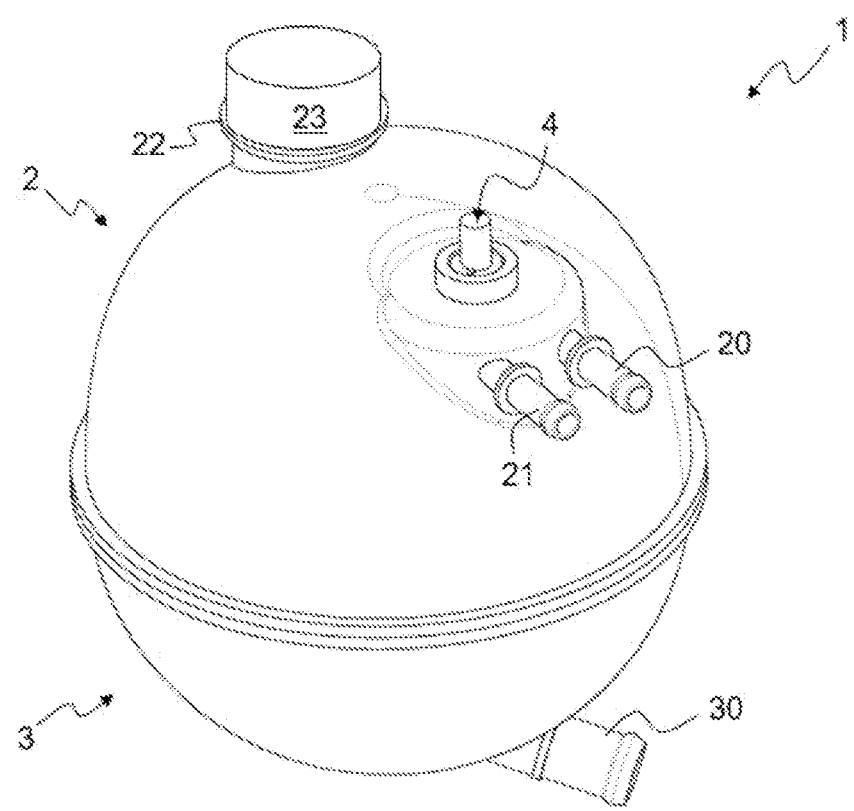
FIG. 1 illustrates an example of a degassing tank according to the disclosure.

Referring to FIG. 1, a degassing tank 1 is illustrated that comprises an upper part 2 and a lower part 3. The upper part 2 comprises a dip tube 4, two inlet lines 20, 21, a neck 22 that describes an opening and a cap 23 screwed to the neck 22 to close the opening. The lower part 3 comprises an outlet line 30.

Figure 2:
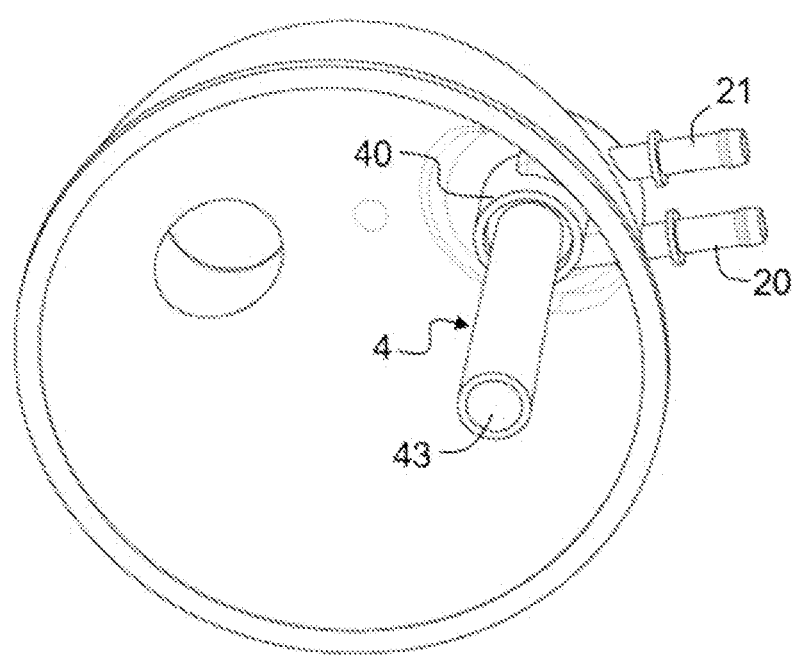
FIG. 2 illustrates the inside of an upper part of the degassing tank in FIG. 1.

The upper part 2 is more clearly shown in FIG. 2. The dip tube 4 extends between the inlet lines 20, 21 and the lower part 3 of the tank 1. The dip tube 4 is rotatably accommodated inside a tubular valve housing 40 in fluid communication with the inlet lines 21.

Figure 3:
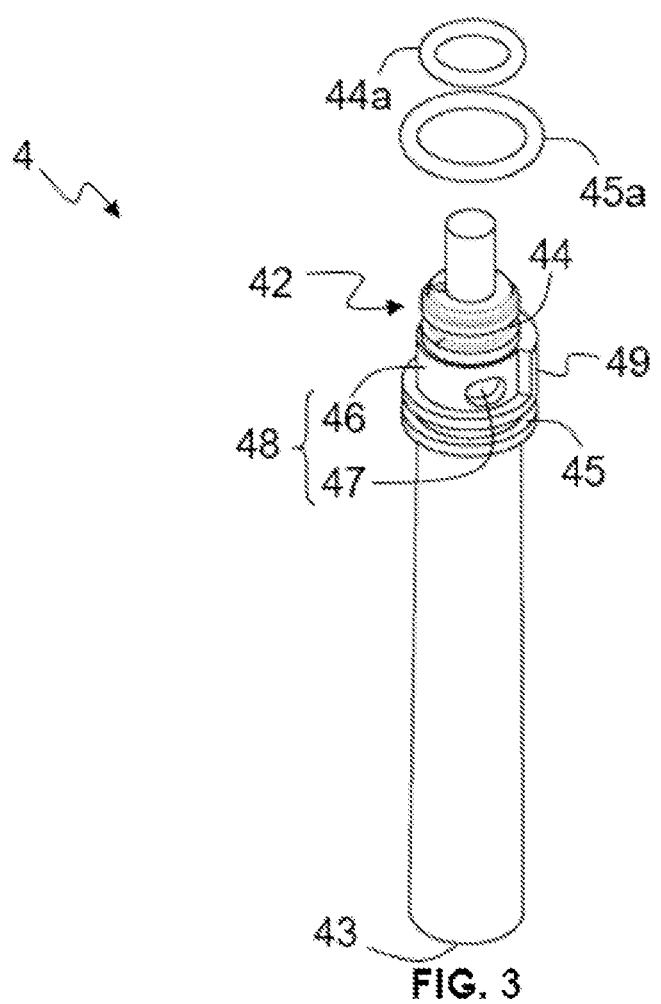
FIG. 3 illustrates the dip tube of the degassing tank in FIG. 1.
Figure 4:
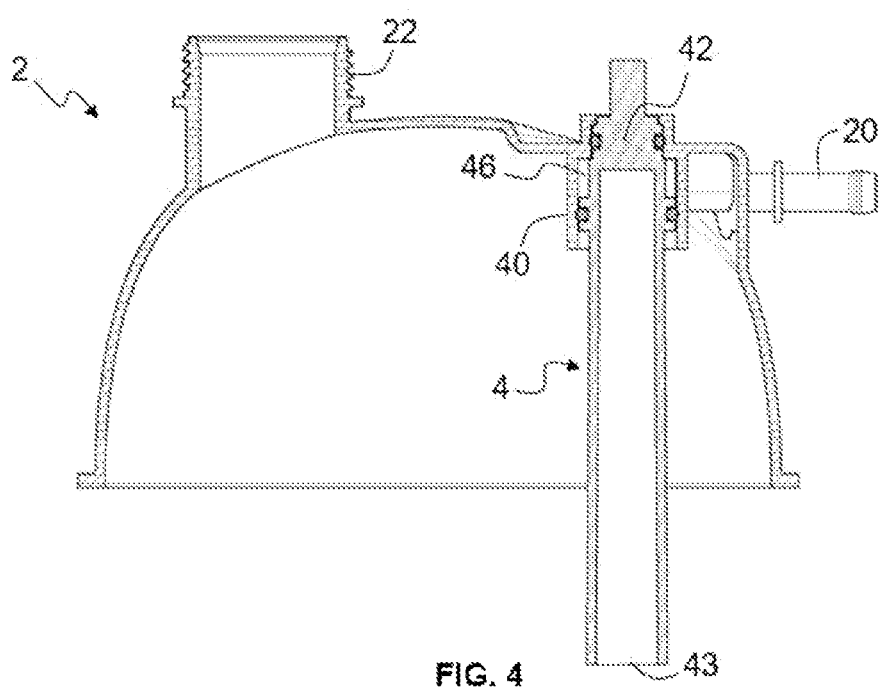
FIG. 4 is a cross-sectional view of the upper part shown in FIG. 2 taken along the longitudinal axis of the dip tube.

The dip tube 4, more clearly shown in FIGS. 3 and 4, comprises a closed end 42 and an open end 43 ending in the lower part 3 of the tank 1. The closed end 42 comprises a circumferential groove 44 designed to hold an O-ring 44a. The dip tube 4 also comprises a second circumferential groove 45 axially spaced along its length relative to the first circumferential groove 44, and which is also configured to hold an O-ring 45a.

A partially circumferential recess 46 is included between the circumferential grooves 44, 45 and a radial hole 47 extends from the base of the partially circumferential recess 46 inside the dip tube 4. The partially circumferential recess 46 and the radial hole 47 together describe a fluid passage 48 for connecting one or both of the inlet lines 20, 21 inside the dip tube 4, such that the dip tube 4 provides a fluid line between the or each of the inlet lines 20, 21 and the lower part 3 of the tank 1. The dip tube 4 also comprises a peripheral surface 49 on the side diametrically opposite the partially circumferential recess 46, to selectively close off one of the inlet lines 20, 21.

Figure 5:
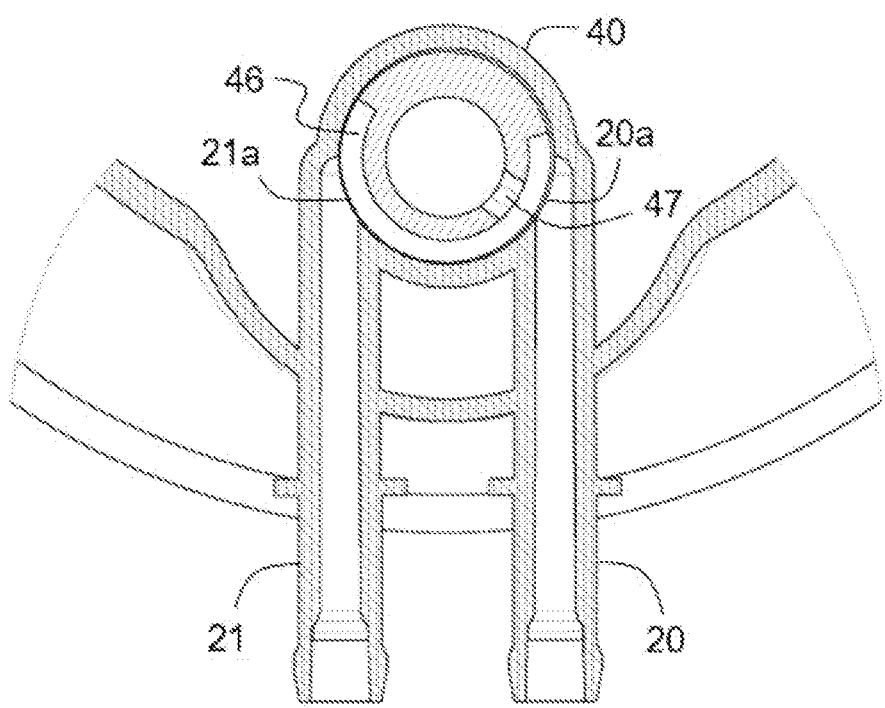
FIG. 5 is a cross-sectional view through the inlet pipes of the degassing tank in FIG. 1, showing the dip tube in a first position.
Figure 6:
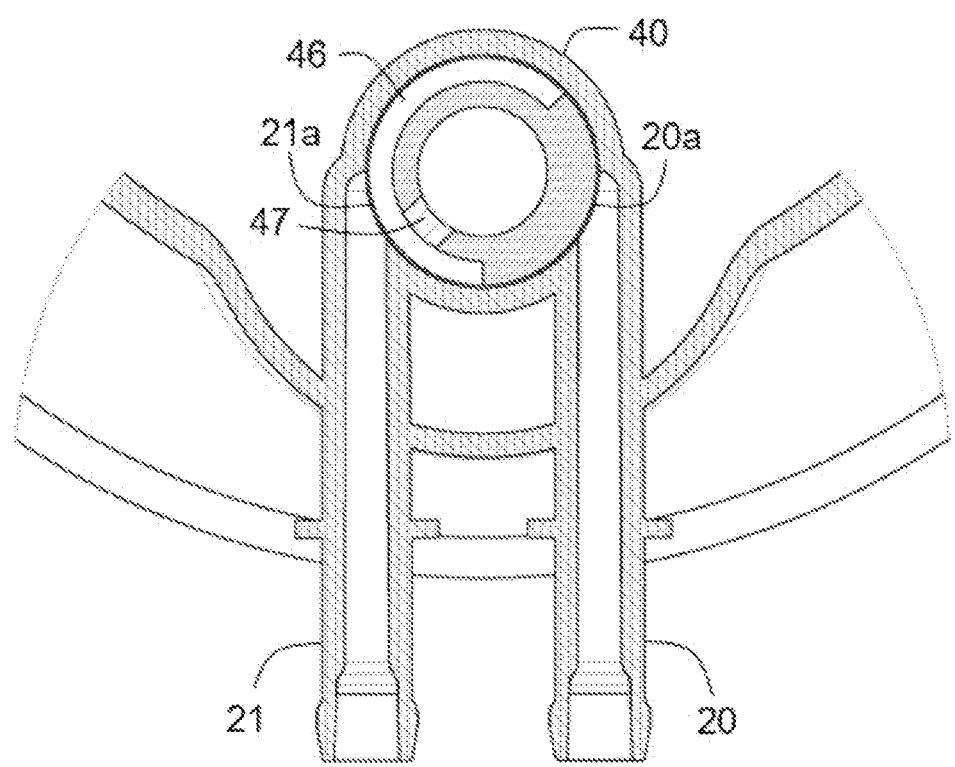
FIG. 6 is a view similar to the one in FIG. 5, showing the dip tube in a second position.

Now referring to FIGS. 5 and 6, the tubular valve housing 40 comprises a first inlet in its inner periphery, which is in fluid communication with a first inlet line 20, and a second inlet 21a in its inner periphery, which is in fluid communication with a second inlet line 21. The dip tube 4 can rotate inside the tubular valve housing 40 to selectively align the partially circumferential recess 46 with one or both of the inlets 20a, 21a.

As shown in FIG. 5, the dip tube 4 has a first position in which the partially circumferential recess 46 is aligned with both inlets 20a, 21a. In this position, the fluid from each of the inlet lines 20, 21 can pass into the partially circumferential recess 46 through the radial hole 47, along the inside of the dip tube 4 and into the lower part 3 of the tank 1.

As shown in FIG. 6, the dip tube 4 has a second position in which the partially circumferential recess 46 is aligned with the second inlet 21a, while the peripheral surface 49 is aligned with the first inlet 20a. In this position, the fluid from the second inlet line 21 can pass into the partially circumferential recess 46, through the radial hole 47, along the inside of the dip tube 4 and into the lower part 3 of the tank 1. However, the peripheral surface 49 closes off the first inlet 20a in this position, thereby preventing fluid communication between the first inlet 20 and the tank 1.

Other solutions can also be considered. Indeed, a person skilled in the art will be aware that several variants of the aforementioned embodiments are conceivable without departing from the scope of the disclosure. For example, the dip tube 4 can have one or more additional positions, as described above.

Throughout the description and claims of this specification, the words "comprise" and "contain" and their variations mean "including but not limited to" and are not intended for (and do not exclude) other parts, additives, components, integers or steps. Throughout the description and claims of this specification, the singular includes the plural, unless the context requires otherwise. In particular, when the indefinite article is used, the specification should be understood to include the plural as well as the singular, unless the context requires otherwise.

Any features, integers, characteristics, compounds or groups described in connection with a particular aspect, embodiment or example of the disclosure are to be understood as being applicable to any other aspect, embodiment or example described herein, unless inconsistent therewith. All of the features disclosed in this specification (including the claims, abstract and accompanying drawings), and/or all of the steps of a method or of a process thus disclosed, may be combined in any combination other than combinations in which at least some of such features and/or steps are mutually exclusive. The invention is not limited to the details of all of the preceding embodiments. The invention extends to any new feature or any new combination of the features disclosed in this specification (including the claims, abstract and accompanying drawings), or to any new feature or any new combination of the steps of any method or process thus disclosed.

The reader's attention is drawn to all papers and documents that are filed concurrently or prior to this specification in connection with this application and that are open for public inspection with this specification, and the content of all such papers and documents is incorporated herein by reference.

What is claimed is:
1. A degassing tank, comprising:
a first inlet; and a dip tube extending between the first inlet and a lower part of the tank, in which the dip tube is movable, when in use, relative to the first inlet between a first position in which the dip tube provides a fluid line between the first inlet and the lower part of the tank, and a second position in which the fluid communication between the first inlet and the lower part of the tank is closed.

2. The degassing tank according to claim 1, wherein the dip tube comprises:
   a fluid passage that is aligned with the first inlet when the dip tube is in the first position, thereby connecting the first inlet to the inside of the dip tube; and
   a peripheral surface that closes off the first inlet when the dip tube is in the second position.

3. The degassing tank according to claim 2, wherein the dip tube is rotatable relative to the first inlet, and the fluid passage comprises a partially circumferential recess in the dip tube with a radial hole in the recess of the dip tube.

4. The degassing tank according to claim 3, further comprising a tubular valve housing that comprises the first inlet.

5. The degassing tank according to claim 4, wherein the dip tube is rotatably accommodated inside the tubular valve housing.

6. The degassing tank according to claim 1, further comprising an actuator configured to move the dip tube between the first and second positions.

7. The degassing tank according to claim 1, further comprising:
   an outlet in the lower part of the tank; and
   a baffle between the dip tube and the outlet.

8. The degassing tank according to claim 7, wherein the baffle at least partially surrounds the outlet.

9. The degassing tank according to claim 1, further comprising a second inlet.

10. The degassing tank according to claim 9, wherein the dip tube provides a fluid line between the second inlet and the lower part of the tank when the dip tube is in each of the first and second positions.

11. The degassing tank according to claim 9, wherein the dip tube provides a fluid line between the second inlet and the lower part of the tank, and the fluid communication between the second inlet and the lower part of the tank is closed when the dip tube is in the first position.

12. The degassing tank according to claim 9, wherein the dip tube provides a fluid line between the second inlet and the lower part of the tank when the dip tube is in the second position.

13. The degassing tank according to claim 9, wherein the dip tube provides a fluid line between each of the first and second inlets and the lower part of the tank when the dip tube is in the first position,
   wherein the fluid communication between the first inlet and the lower part of the tank is closed when the dip tube is in the second position,
   wherein the dip tube provides a fluid line between the second inlet and the lower part of the tank when the dip tube is in the second position, and
   wherein the fluid communication between each of the first and second inlets and the lower part of the tank is closed when the dip tube is in a third position.

14. A cooling circuit, comprising a degassing tank according to claim 1.

15. A vehicle, comprising a cooling circuit according to claim 14.

* * * * *